United States Patent

Potvin

[15] 3,635,377
[45] Jan. 18, 1972

[54] MATERIAL-TRANSPORTING DEVICE
[72] Inventor: Raoul J. Potvin, Franklin, Pa.
[73] Assignee: Conair, Incorporated, Franklin, Pa.
[22] Filed: Aug. 19, 1969
[21] Appl. No.: 851,224

[52] U.S. Cl..................................222/145, 222/435, 302/55
[51] Int. Cl.............................................................B67d 5/60
[58] Field of Search..............302/55, 36; 222/132, 145, 435, 222/440, 290; 220/22

[56] References Cited

UNITED STATES PATENTS

| | | | |
|---|---|---|---|
| 1,532,122 | 4/1925 | Caracristi | 302/55 |
| 2,455,572 | 12/1948 | Evans | 222/145 X |
| 2,723,057 | 11/1955 | Golden | 302/55 |
| 3,090,593 | 5/1963 | Pro | 302/55 |
| 3,174,652 | 3/1965 | Villemure | 222/145 |
| 2,459,940 | 1/1949 | Himmel | 220/22 |

FOREIGN PATENTS OR APPLICATIONS

| | | | |
|---|---|---|---|
| 875,426 | 8/1961 | Great Britain | 302/55 |
| 648,039 | 12/1950 | Great Britain | 220/22 |
| 1,023,792 | 3/1953 | France | 220/22 |

*Primary Examiner*—Joseph Wegbreit
*Assistant Examiner*—Merle F. Maffei
*Attorney*—E. Wallace Breisch

[57] ABSTRACT

A device for transporting pulverant, finely divided or granular material from a source of such material to an interim material-receiving loader or chamber having improved valve means for controlling the discharge of one or more materials from the chamber and which valve means can additionally distribute the discharged materials within a subsequent receiving chamber.

10 Claims, 5 Drawing Figures

INVENTOR.
Raoul J Potvin.

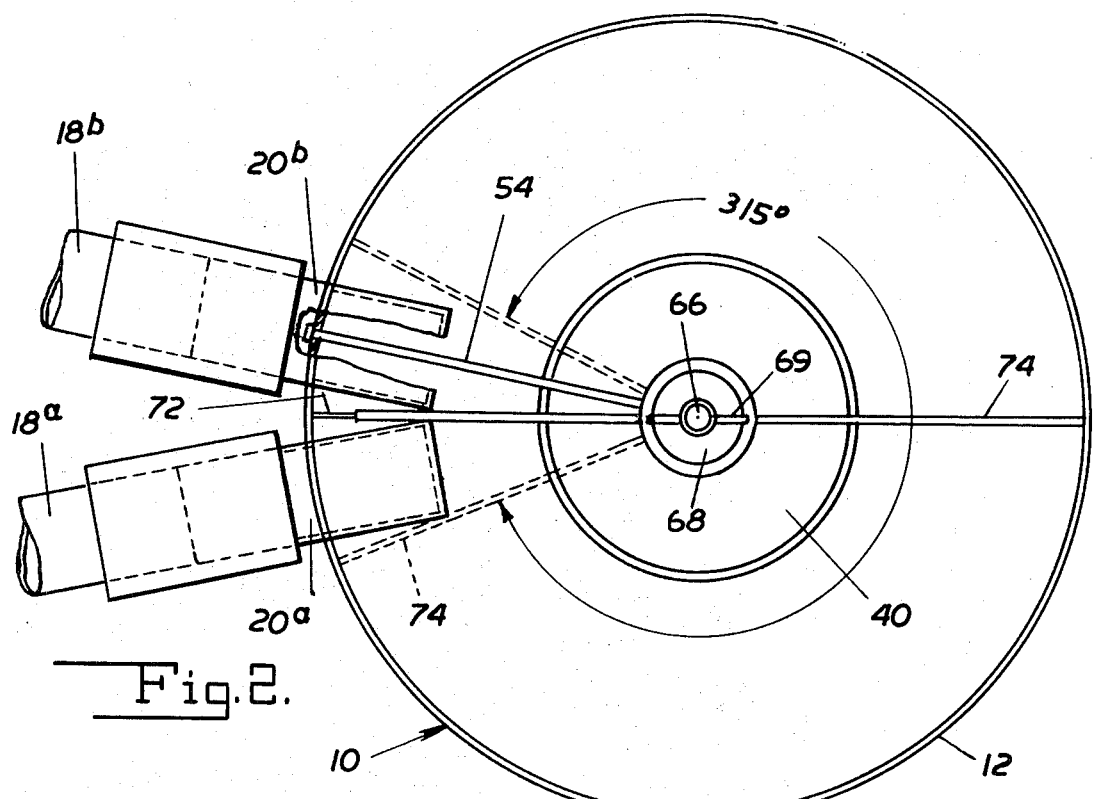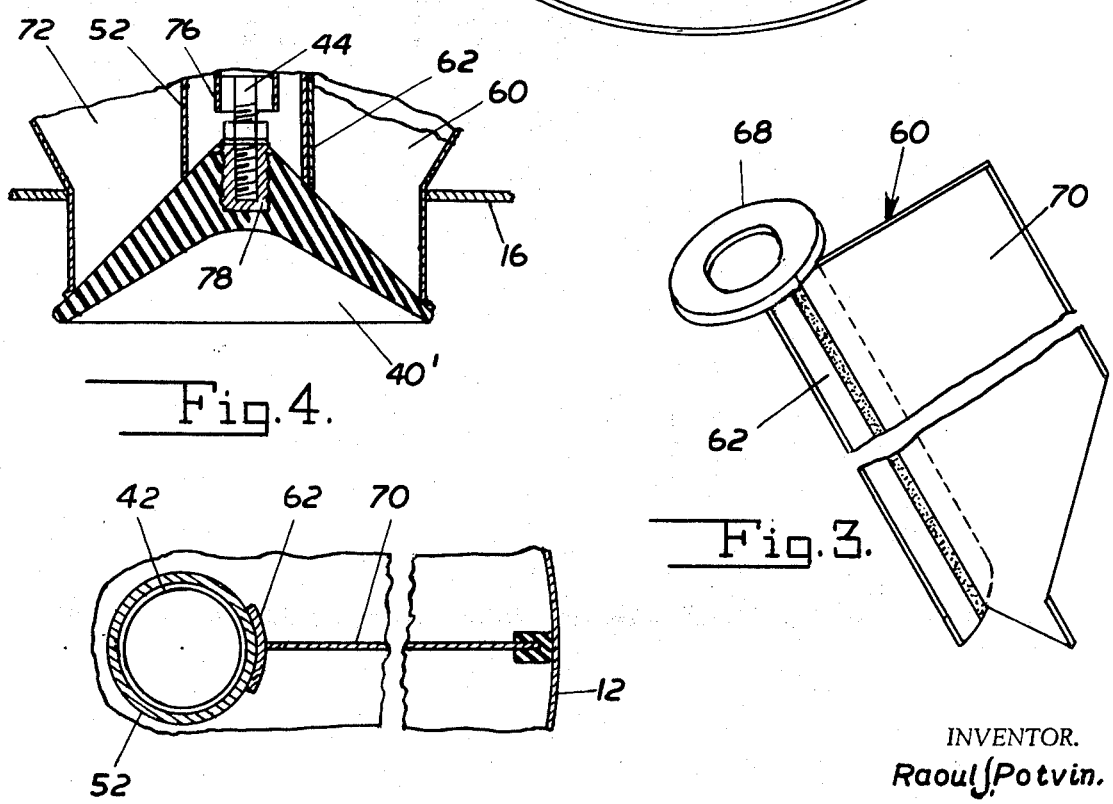

MATERIAL-TRANSPORTING DEVICE

In many industries such as the plastic industry it is common practice to transport finely divided, granular or pulverant material from one or more storage bins, through one or more feedlines having a free end embedded in the respective materials to be transported, to a material-receiving chamber by creating a vacuum in the receiving chamber so that the resultant airflow through the material and the one or more feedpipes entrains the material in the airstream flowing to the receiving chamber. The airstream carrying the material entrained therein enters the chamber and the entrained material is deposited in the chamber while the air is withdrawn therefrom by a vacuum pump. After the receiving chamber has been loaded the material deposited therein is subsequently discharged into a material-receiving compartment of any suitable apparatus such as a hopper for a machine subsequently processing the material. Heretofore various valve means for controlling the discharge of the material from such a chamber have been employed; however, in general they have not been entirely satisfactory in that they have either permitted vacuum leakage, leakage of material from the chamber, have restricted flow of material from the chamber, or have discharged material into the hopper such that the material is not distributed as desired throughout the hopper.

Accordingly, one object of this invention is to provide a new and improved material-transporting device for granular or pulverant material having improved means for controlling the discharge of material therefrom.

Another object of this invention is to provide a new and improved material-transporting device having improved means for controlling the simultaneous discharge of a plurality of materials therefrom.

These and other objects of this invention will become more apparent when considered in conjunction with the description of the following preferred embodiments as shown in the accompanying drawings in which:

FIG. 2 is a top plan view of the material-transporting device as shown in FIG. 1 with the cover and filter removed therefrom;

FIG. 3 is a perspective view of a movable partition as utilized in the transporting device shown in FIG. 1;

FIG. 4 is a partial view showing an alternate valve structure for use in the transporting device as shown in FIG. 1;

FIG. 5 is a partial view of the movable partition and body of the device as shown in FIG. 1 taken along line 5—5 thereof.

Figure 1:
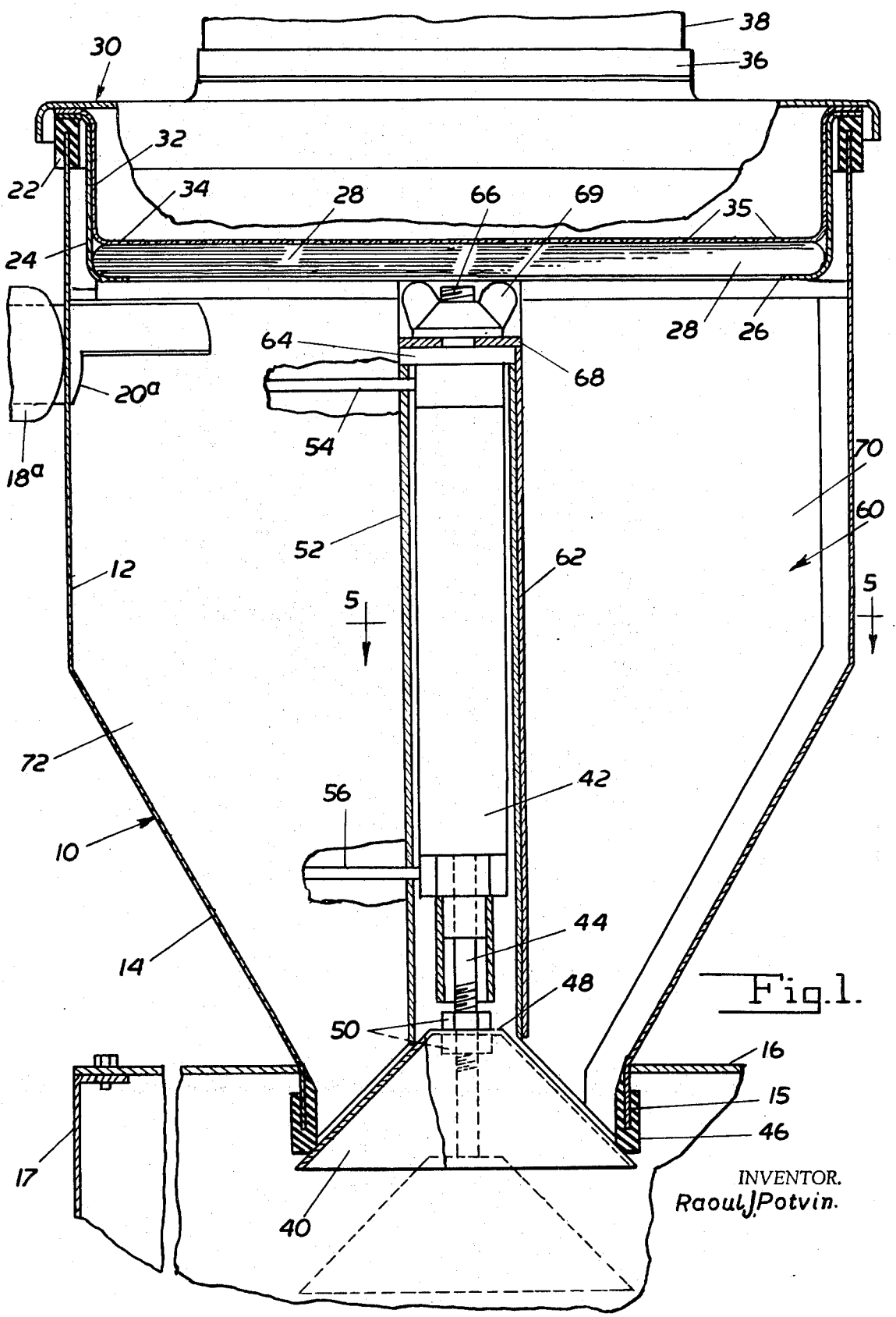
FIG. 1 is a cross-sectional view of a material-transporting device constructed in accordance with the principles of this invention having portions thereof shown in side elevation.

FIG. 1 illustrates a material-transporting device or loader 10 of this invention which, in use, is vertically located and as shown comprises an upper cylindrical body portion 12 having a frustoconical lower body portion 14 extending coaxially downwardly therefrom which terminates in a lowermost downwardly extending circular flange portion 15. Other forms of loader 10 can be utilized as desired. Loader 10 is provided with a suitable mounting plate 16 which extends outwardly from the flange portion 15 to provide means for mounting the loader 10 on a material-receiving hopper 17 of a machine such as a plastic molding machine. The upper edge of the upper body portion 12 is provided with an encompassing ring-shaped resilient sealing member 22 which resiliently engages the lower surface of an outwardly flanged cup-shaped filter support member 24. Filter support 24 has the cup-shaped portion thereof extending inwardly of the upper body portion 12 with the lower edge thereof being located upwardly adjacent connectors 20a and 20b extending radially inwardly of the upper body portion 12. Material is supplied to the loader 10 through suitable material feedlines 18a and 18b (see U.S. Pat. No. 3,018,135) the upper ends of which are respectively connected to the outwardly accessible ends of the connectors 20a and 20b. Filter support 24 has a central opening 26 in the lower portion thereof across which a suitable filter 28 extends. Filter 28 is held in operating position by means of a cover 30 having a central depending cylindrical portion 32 which nests within the filter support 24 and has a lower plate portion 34 extending across the upper surface of the filter 28. The lower plate portion 34 has a plurality of holes 35 therein to permit a proper volume of air to flow therethrough during the operation of the device. The outer periphery of the cover 30 extends radially outwardly and over the upper flange portion of the filter support 24 and is removably clamped to the upper body portion 12 by any suitable clamping means (not shown). Cover 30 also supports a suitable air or vacuum pump 36 above the lower plate portion 34 for evacuating air from the interior of the loader 10 which pump 36 is suitably driven by any suitable means such as an electric motor 38 (shown in part) supported by the housing of pump 36. Although not shown the energization of the electrical motor 38 is controlled by means of a member located in the hopper which receives material from the loader 10 which means senses the demand for material in the hopper. Inasmuch as all portions of the loader as heretofore described are well known in the art and have been previously shown and described in various prior art patents such as U.S. Pat. No. 3,273,943 further description thereof is not necessary for understanding of this invention by one skilled in the art. Further, if desired, a known remote or any other suitable vacuum source can be employed rather than the integral motor and pump described.

The loader of this invention distinguishes over similar purpose material-transporting devices in that an inverted cup-shaped movable valve member 40 is utilized which controls the discharge of material from the loader 10 to the machine hopper with the movement of the valve member 40 being controlled by means of a selectively actuatable device.

Valve member 40 moves towards and outwardly from the flange portion 15 and in order to provide an air seal therebetween the flange portion 15 has a suitable encompassing resilient ring-shaped gasket 46 suitably secured thereto which gasket 46 extends circumferentially around the inner surface of the flange portion 15 to define the discharge opening for the loader 10. The lowermost portion of the gasket 46 extends around the lower free edge of the flange portion 15 and is engaged by an upwardly facing annular surface portion of the valve member 40 upwardly adjacent from the lower edge thereof. An uppermost central portion 48 of valve member 40 is provided with a central clearance opening to adjustably axially position the valve member 40 upwardly from the free end of an elongated rod 44 of an elongated air cylinder 42. As shown the lower portion of rod 44 is axially threaded to adjustably receive jamnuts 50 on opposite sides of the uppermost portion 48. Rod 44 is selectively axially reciprocable on the central vertical axis of the loader 10 by means of the air cylinder 42 which cylinder 42 is closely received in a tubular housing or shield 52 and suitably rigidly supported with the central axis thereof coincident with the central axis of the loader 10. As shown, the ends of the cylinder 42 are secured to upper and lower air supply and exhaust lines 54 and 56 respectively which lines 54 and 56 are formed from a suitable material, such as steel tubing or flexible airlines and extend (see FIG. 2) radially through the shield 52, the interior of the loader 10 and through the sidewall thereof to permit the outer free ends thereof to be connected to a suitable source of controlled cylinder actuating air (not shown).

Although the cylinder 42 can be of any suitable axial length to obtain the desired axial movement of the rod 44 and valve member 40, the axial length thereof is preferably, as shown, sufficient to locate the upper end a sufficient distance below the filter 28 such that the upper end thereof provides a platform or base engaged by a releasable locking means for a movable partition or divider 60. Partition 60 (see FIG. 3) has an arcuate plate portion 62 extending from upwardly adjacent the upper surface of the valve member 40 (in the closed position) along the entire length of the tube 52 to a location upwardly adjacent the upper end of the cylinder 42 and is of an arcuate contour to slide over and be guided by the outer surface of tube 52. In addition such form of plate portion 62 prevents migration of material around the inner end of the partition 60. The upper end of cylinder 42 has a suitable spacer or washer 64 suitably rigidly secured thereto which washer 64 has a threaded stud portion 66 extending upwardly therefrom coaxially with the loader central axis. The upper end of partition 60 has an integral washer portion 68 having a central clearance opening therein through which the stud portion 66 extends so that the washer portion 68 overlies the washer 64 and the plate portion 62 abuttingly slidably engages the outer surface of the tube 52. Partition 60 is releasably fixedly secured with respect to the tube 52 by any suitable means such as the threaded wingnut 69 axially movable along the uppermost portion of the stud portion 66.

Partition 60 has a plate portion 70 extending radially outwardly from the arcuate plate 62 with the outer periphery thereof conforming to the cross section of the loader 10 in which material is received. That is, an upper edge extending radially from the tube 52 downwardly adjacent the lower surface of the support 26, an upper outer vertical edge extending downwardly and inwardly of and along the inner surface of the upper portion 12, a lower outer edge extending downwardly and inwardly of and along the inner surface of the lower portion 14, a lowermost vertical edge extending downwardly from the bottom of the lower outer edge to upwardly adjacent the lower surface of the gasket 46, and a lowermost edge which extends upwardly adjacent and along the upwardly facing surface of the valve member 40 between the lower ends of the plate 62 and the lowermost vertical edge.

In order to eliminate migration of the granular materials around the vertically extending outer edge of the partition 60 the outer edge of the plate portion 70 thereof is preferably provided with a suitable resilient gasket 71 (as shown in FIG. 5) which engages and slides over the adjacent inner surfaces of the upper and lower portions 12 and 14.

A rigid partition or plate portion 72, of substantially the same form as plate portion 70, is suitably rigidly secured to the outer surface of tube 52 and the inner surface of body portions 12 and 14 to prevent migration of material within the loader 10 around the vertically extending edges of the partition 72. In particular (see FIG. 2) partition 72 extends radially between the connectors 20a and 20b so that, in conjunction with partition 60 the interior of the loader 10 is divided into separate material-receiving portions. Further a suitable gasket 74, such as a vinyl strip, extends along the upper edges of plate portions 70 and 72 to minimize the possible wear or abrasion between the filter 28 and the upper edges of the plate portions.

The preferred embodiment heretofore described provides a loader in which two different granular materials are obtained from separate sources and discharged from the loader in a substantially definite or fixed ratio, it being recognized that known adverse characteristics of certain granular materials can effect the desired operation of the device. In order to obtain a particular ratio of materials discharged the nut 69 is released (with the cover 30, filter 28 and filter support 24 removed) and the partition 60 moved or swung around tube 52 to any desired intermediate position between its extreme clockwise and counterclockwise positions, with reference to FIG. 2. Since connectors 20a and 20b project within loader 10 the engagement of the plate portion 70 with the connectors 20a and 20b defines such extreme positions of the partition 60, which in the embodiment shown constitutes substantially 315° of travel. Thus, the lines 54 and 56 are located between such extreme positions of the partition 60 at any convenient location. With the partition 60 located as desired the nut 69 is tightened to fixedly locate the partition 60 and the filter 28 and cover 30 are sequentially secured to the body portion 12.

Thereafter, when the hopper 17 is less than full and there is a controlled demand for material, the motor 38 is energized and the pump 36 draws the air from the interior of the loader 10 through the filter 28 such that fluidized material from separate sources flows through lines 18a and 18b and is discharged through connectors 20a and 20b, respectively, into the separate interior portions of the loader 10, that is, the connectors 20a and 20b discharge separate materials into separate portions of the loader 10 since the connectors 20a and 20b are on opposite sides of the partitions 60 and 72. During such loading the valve 40 is normally closed although under certain conditions loading of the loader 10 can be done with the valve 40 open. After the loader 10 has been loaded with the valve 40 closed and upon demand of material for the hopper the line 54 is subsequently opened in a known control sequence to supply air to the cylinder 42 such that the rod 44 with valve 40 attached moves downwardly to open the discharge opening of the loader 10 to the hopper. The granular material in each portion of the loader 10 then flows gravitationally through such discharge opening into the machine hopper; however, during such gravitational flow the freely falling granular material impinges upon the upper conical surface of the valve 40 and is distributed radially along such surface. Thus the free fall discharge or flow path of the material is interrupted to provide a radially outwardly force component to the falling material whereby the area over which the material is distributed within the hopper is substantially greater as compared with such material falling directly into the hopper with unimpeded flow. Since material is simultaneously discharged from each portion of the loader 10 and such materials generally have the same flow characteristics a mixture of two materials is discharged into the hopper in a definite ratio dependent upon the ratio of the discharge openings for each granular material. After the hopper has received the desired amount of material the air supply from line 54 is discontinued and air is supplied to line 56 (which previously had no supply) to move the rod 44 with valve 40 attached upwardly with the conical surface of the valve 40 moving into engagement with the gasket 46 to close the discharge opening of the loader 10. After closing of the discharge opening the airflow through line 56 is discontinued and the cylinder 42 is operable thereafter to hold the valve 40 in the closed position.

It is realized that the sequence of operation described is dependent upon suitable controls; however, such controls are well known in such art and need not be described. Further although an air cylinder is preferred since air is used for other purposes with such loaders any type of selectively operable device to move the valve 40 in the manner described can be utilized in this invention. Also, in the preferred embodiment the cylinder 42 is located within the loader 10 since loaders are a separate item of commerce; however, if desired the means for activating the valve 40 can be external of the loader 10 such as by being located in the hopper. The details of the cylinder 42 need not be particularly described as any suitable well-known cylinder for operating the valve 40 as described can be employed.

Of particular significance is the fact that although this invention is preferably employed in loaders for discharging separate materials in a fixed ratio such preferred embodiment need not be followed to obtain the benefits of this invention. Thus, without regard to material ratios the invention is also greatly desired when a uniform material is discharged from the loader 10. With a single type of granular material a single inlet 18a and connector 20a are used and no partitions 60 and 72 are provided. The remainder of the structure is generally as described and shown except different suitable means are employed to support the cylinder 24, such as by extending the feed tube and suspending the cylinder 24 therefrom, and valve 40 provides an improved material distribution of such single material in the receiving hopper. Once the inventive concept herein has been disclosed various modifications of such concept will become obvious to those skilled in the art. One such modification is a tubular shield 76 for protecting the lower end of the rod 44. Another modification is to provide the upper surface of the valve 40 with a resilient material to provide an alternative seal with the gasket 46 or to permit eliminating the gasket 46.

FIG. 4 illustrates a particularly desired modification in which the valve member 40 is replaced with a valve member 40' formed from a resilient material such as rubber or plastics which valve 40' functions in the same manner as valve 40. Since valve 40' is formed of resilient material a suitable threaded insert 78 is provided to threadedly receive the lower end of the rod 44. Further the valve 40' has a body mass which is sufficient to provide a seal for the discharge opening and the lower edges of partitions 60 and 72 during operation in the manner as described herein.

Although the upper conical surface of the valve 40 as described is preferred, the upper surface of the valve 40 can be of various suitable forms which permit sealing engagement with the discharge opening of the loader 10 and which provide for outward deflection of the freely falling granular material. Further the valve 40 is of a peripheral extent with relation to the size of the receiving hopper to provide a distribution of granular material in the hopper such that accumulations of granular material at the sides of the hopper or voids immediately below the valve 40 are avoided. Since the distribution of material within the hopper is dependent to a large degree upon the angle of repose and the mass of the granular material being transported the upper surface of valve 40 is designed with relation to the material being distributed and the size of the receiving hopper. Thus the slope and shape of the upper surface of the valve 40 varies as desired and that illustrated is not essential. It is, however, preferable that the lowermost peripheral edge of the valve 40 extend laterally outwardly beyond the downward projected periphery of the discharge opening of the loader 10 to positively eliminate any straight line of free fall of the material, that is, to insure that all the falling material impinges upon the upper surface of the valve 40 and is deflected.

It is also contemplated that the discharge opening of the loader 10 need not extend horizontally and various orientations of loader discharge openings which permit gravitational flow of granular material can be used as long as a valve member, equivalent in function to that of valve 40, as described, is employed.

In some installations the size of feedlines 18a and 18b differ in size due to different flow characteristics of different materials the volume of material to be handled the distance the material has to flow and other known circumstances.

As described this invention can be used for controlling the discharge of a single material from a loader or for controlling the discharge of two materials in a desired determinable ratio. Other particular modifications that are contemplated are to obtain a mixing of three, four, five, etc., granular materials in a fixed ratio. The number of materials that can be controlled is limited only by size limitations of the loader 10. In such embodiments additional connectors 20 and movable partitions 60 would have to be provided in an obvious manner.

Although an embodiment has been shown and described which is the preferred embodiment at this time, it is contemplated that such embodiment will be modified to utilize a loader 10 in the form of a truncated cone, and to utilize feed tubes 20a and 20b which are parallel to partition 72 having bevel cut ends extending oppositely away from each other. Such feed tubes are expected to be easier to assemble and may slightly reduce the arcuate travel of partition 72. The gap between the support 24 and the interior of the loader 10 can be suitably eliminated. Further circular flange 15 can be eliminated and the discharge opening of the loader 10 terminated at the mounting plate 16. With such structure the valve 40 would move into sealing engagement with the opening in the plate 16, terminated Preferred embodiments of the principles of this invention having hereinbefore been described and illustrated it is to be realized that other structures applying these same principles are envisioned and possible. It is therefore respectfully requested that the invention be interpreted as broadly as possible and limited only by the claims appended hereto.

What is claimed is:

1. In a loader in which granular material or the like is accumulated prior to discharge therefrom the improvement comprising, a vertically extending material chamber having a lower discharge opening, a plurality of partition means located within said chamber to divide said chamber into vertically extending chamber portions having the lower ends thereof in open communication with said opening, said partition means including movable partition means supported within said chamber for pivotal movement about a vertical axis of said chamber to vary the volume of said chamber portions adjacent said movable partition means, and valve means selectively movable into engagement with the periphery of said opening and the lowermost portions of said partition means to close the lower ends of said chamber portions and out of said engagement to permit material to be discharged from said chamber portions.

2. A loader as set forth in claim 1 in which said plurality of partition means consists of two partition means.

3. A loader as set forth in claim 1 in which said vertical axis is the central axis of said chamber.

4. A loader as set forth in claim 3 in which said movable partition means are pivotal about said central axis.

5. A loader as set forth in claim 3 in which said valve means has a conical upper surface with the central axis thereof coincident with said central axis of said chamber.

6. A loader as set forth in claim 5 in which at least the upper surface of said valve means is resilient and deformable.

7. A loader as set forth in claim 1 having a selectively energizable operating member located within said chamber, and said operating member having a selectively movable portion secured to said valve means for moving said valve means to open and close said opening.

8. A loader as set forth in claim 7 in which said movable portion of said operating member selectively reciprocates along the central axis of said chamber, and said valve means has a central axis coincident with said central axis of said chamber.

9. A loader as set forth in claim 7 in which said valve means is of a form and in a location to impart a lateral component of movement of material upon the discharge thereof from said chamber portions.

10. A loader as set forth in claim 7 in which said movable partition means are releasably secured to said operating member with the pivot axis thereof being coincident with the central axis of said chamber.

* * * * *